UNITED STATES PATENT OFFICE.

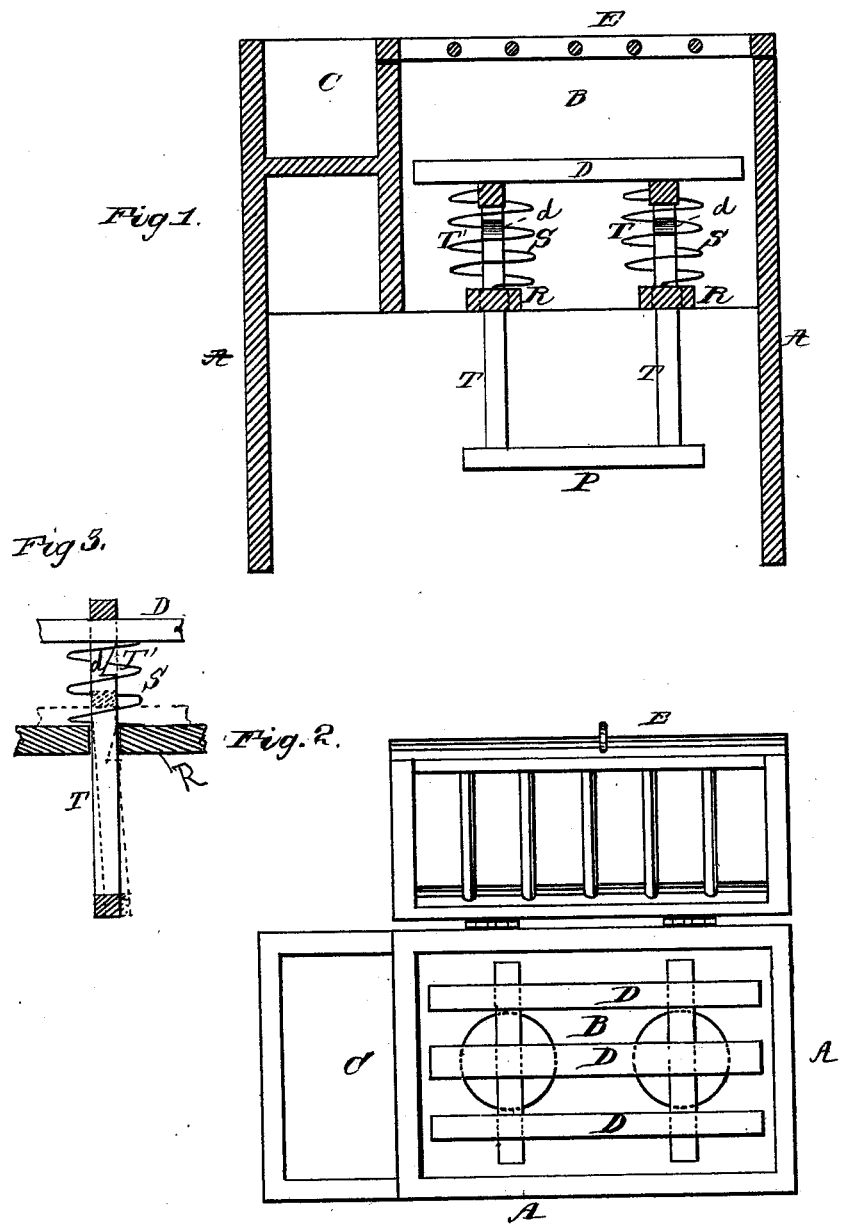

JAMES N. CRABB, OF RICHMOND, INDIANA.

IMPROVEMENT IN MANGERS.

Specification forming part of Letters Patent No. 195,351, dated September 18, 1877; application filed August 18, 1877.

*To all whom it may concern:*

Be it known that I, JAMES N. CRABB, of Richmond, county of Wayne and State of Indiana, have invented certain Improvements in Mangers, of which the following is a specification:

My invention relates to an improved manger for horses and other animals, consisting of a series of devices by which the hay or fodder is held and prevented from being wasted by the animals, as will be hereinafter fully described.

Figure 1 is a longitudinal vertical section. Fig. 2 is a top view.

A A is the frame or box. B is the bin for holding the hay or fodder. C is a trough for holding corn or other grain. D is a spring-bottom to the manger. E is a lid or cover to the bin, formed by bars or rods. S S are spiral springs, by which the platform D is pressed upward. T T are uprights attached to the platform D, and around which the springs S are placed or coiled. P is a cross-piece attached to the lower ends of the uprights T, and R R are two pieces attached to the bottom of the bin, and having mortises in the center of them, through which the uprights T pass. These uprights have notches $d$ in them, as shown in Fig. 3, which catch upon one side of the mortises when the platform and springs are pressed downward to receive the charge of hay or fodder. When the bin is being filled the top or cover E is thrown up, as seen in Fig. 2, and toward the animal, which prevents the animal from being endangered by the fork in filling the bin.

The operation is as follows: The foot is placed on the cross-piece or treadle P, and the platform pressed downward until the notches in the uprights T catch on the side of the mortise in the center of the cross-bars R; then the top or cover E is thrown up and the bin filled, when the top is brought down and fastened in any convenient manner, when, with the foot, the notches in the uprights T are removed, and the springs press the hay or fodder upward against the top or cover until the whole is consumed, thus preventing waste and effectually separating the seed and dust from the hay, the dust falling by its gravity through the slatted bottom of the bin out of the way.

The top or cover may be made either of wood or metal.

The springs may be replaced by weights or other means of raising the platform.

Having thus fully described my invention, what I claim, and desire to secure by Letters Patent, is—

1. The combination, with the adjustable platform D of a manger, of the notched uprights T, cross-piece P, and mortised cross-bars R, substantially as and for the purpose herein shown and described.

2. The combination, with the bin and slatted hinged cover, of the slatted bottom or platform D, springs S, mortised cross-bars R, notched uprights T, and cross-piece P, the several parts constructed and arranged as herein shown and described.

JAMES N. CRABB.

Witnesses:
F. B. HUNT,
J. M. RATLIFF.